US012606658B2

(12) United States Patent
Markel

(10) Patent No.: US 12,606,658 B2
(45) Date of Patent: Apr. 21, 2026

(54) ISOBUTANE-CONTAINING INDUCED CONDENSING AGENTS IN FLUIDIZED BED POLYMERIZATION REACTIONS

(71) Applicant: ExxonMobil Chemical Patents Inc., Baytown, TX (US)

(72) Inventor: Eric J. Markel, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 862 days.

(21) Appl. No.: 17/756,669

(22) PCT Filed: Nov. 23, 2020

(86) PCT No.: PCT/US2020/061783
§ 371 (c)(1),
(2) Date: May 31, 2022

(87) PCT Pub. No.: WO2021/126479
PCT Pub. Date: Jun. 24, 2021

(65) Prior Publication Data
US 2022/0411549 A1     Dec. 29, 2022

Related U.S. Application Data

(60) Provisional application No. 62/949,283, filed on Dec. 17, 2019.

(51) Int. Cl.
| | |
|---|---|
| *C08F 210/16* | (2006.01) |
| *C08F 2/01* | (2006.01) |
| *C08F 2/34* | (2006.01) |
| *C08F 10/02* | (2006.01) |

(52) U.S. Cl.
CPC .............. *C08F 210/16* (2013.01); *C08F 2/34* (2013.01); *C08F 2/01* (2013.01); *C08F 10/02* (2013.01)

(58) Field of Classification Search
CPC .......... C08F 2/34; C08F 210/16; C08F 10/02
See application file for complete search history.

(56) References Cited

U.S. PATENT DOCUMENTS

| | | |
|---|---|---|
| 4,543,399 A | 9/1985 | Jenkins et al. |
| 4,588,790 A | 5/1986 | Jenkins et al. |
| 5,352,749 A | 10/1994 | DeChellis et al. |
| 5,405,922 A | 4/1995 | DeChellis et al. |
| 5,436,304 A | 7/1995 | Griffin et al. |

(Continued)

FOREIGN PATENT DOCUMENTS

AU     2008200195 B2     6/2010

*Primary Examiner* — Rip A Lee
(74) *Attorney, Agent, or Firm* — C. Tumey Law Group PLLC

(57) ABSTRACT

Ethylene, alpha olefins, and other olefinically unsaturated monomers may be polymerized under fluidized bed polymerization reaction conditions in the presence of a Ziegler-Natta catalyst. A recycle stream featuring an induced condensing agent (ICA) comprising isobutane may increase catalyst productivity while maintaining quality of the polymer product, particularly when the recycle stream is delivered to a reactor containing the fluidized bed under conditions suitable to form a condensed or super-condensed mode in the recycle stream. The recycle stream may comprise unreacted olefinic monomers, and isobutane or a mixture of isobutane and isopentane.

17 Claims, 5 Drawing Sheets

(56)          References Cited

U.S. PATENT DOCUMENTS

|  |  |  |  |  |
|---|---|---|---|---|
| 7,531,606 | B2 * | 5/2009 | Hendrickson | C08F 10/00 |
|  |  |  |  | 526/348 |
| 7,696,289 | B2 * | 4/2010 | Fischbuch | C08F 10/00 |
|  |  |  |  | 526/901 |
| 10,174,142 | B2 * | 1/2019 | Savatsky | B01J 8/1836 |
| 10,377,841 | B2 * | 8/2019 | Sandell | C08F 4/24 |
| 10,745,499 | B2 * | 8/2020 | Banat | C08F 2/34 |
| 11,119,270 | B2 | 9/2021 | Bickham et al. |  |
| 11,192,970 | B2 * | 12/2021 | Pannell | C08F 4/14 |
| 11,274,170 | B2 * | 3/2022 | Brandl | C08F 2/00 |
| 2005/0137364 | A1 | 6/2005 | Cai et al. |  |
| 2005/0182207 | A1 * | 8/2005 | Singh | C08F 10/02 |
|  |  |  |  | 526/901 |
| 2007/0265400 | A1 | 11/2007 | Fischbuch et al. |  |
| 2008/0045663 | A1 | 2/2008 | Kolb et al. |  |
| 2017/0355791 | A1 | 12/2017 | Savatsky et al. |  |
| 2019/0010261 | A1 | 1/2019 | Banat |  |
| 2022/0098332 | A1 * | 3/2022 | Savatsky | C08F 10/00 |

* cited by examiner

ISOBUTANE-CONTAINING INDUCED CONDENSING AGENTS IN FLUIDIZED BED POLYMERIZATION REACTIONS

CROSS-REFERENCE OF RELATED APPLICATIONS

This application is a National Phase Application claiming priority to PCT Application Serial No. PCT/US2020/061783, filed Nov. 23, 2020, which claims the benefit of U.S. Provisional Application 62/949,283 filed Dec. 17, 2019, entitled "Isobutane-Containing Induced Condensing Agents in Fluidized Bed Polymerization Reactions", the entireties of which are incorporated by reference herein.

FIELD

The present disclosure relates to fluidized bed polymerization reactions utilizing an induced condensing agent (ICA) that contains isobutane or an isobutane mixture.

BACKGROUND

Fluidized bed polymerization reactions may produce a diverse array of polymers, particularly polyolefins, through a gas phase polymerization process that takes place at the gas-solid interface of supported catalyst particulates, in which the catalyst particulates are in a fluidized cloud in the reactor vessel. Illustrative polyolefins that may be produced by fluidized bed polymerization reactions include, for example, polyethylene, poly(alpha olefins) and copolymers of ethylene and one or more alpha olefin monomers. Depending on the properties being targeted in the polyolefin (e.g., molecular weight, branching, tacticity, crystallinity, polydispersity, melt index, and similar features), a metallocene catalyst or a Ziegler-Natta catalyst, including Ziegler-Natta type catalysts, may be employed to promote the polymerization reaction under fluidized bed reaction conditions.

Ziegler-Natta catalysts and similar types of polymerization catalysts are often catalytically active at multiple sites and typically form polyolefins having a relatively wide range of molecular weights. Metallocene catalysts, in contrast, while functioning in a mechanistically related manner to Ziegler-Natta catalysts, are usually catalytically active at only a single site and typically form polyolefins featuring a narrower molecular weight distribution.

Gas phase polymerization reactions to form polyolefins under fluidized bed reaction conditions include introducing a gas phase reactant stream comprising one or more olefin monomers into a suitable reactor containing a fluidized bed of catalyst particulates, wherein the introduction velocity of the gas phase reactant stream, optionally in combination with another gas phase stream, promotes fluidization of at least a portion of the catalyst particulates. Polymer particulates may form within the pore space of the fluidized catalyst particulates, with the size of the polymer particulates being regulated by the volume of the available pore space.

Only a fraction of the olefin monomers in the gas phase reactant stream undergo polymerization as they pass through the reactor. Upon leaving the reactor, unreacted olefin monomers may recirculate to the reactor as a recycle stream to promote more complete utilization of the olefin monomers for forming the polymer particulates. Desirably, the unreacted olefin monomers leaving the reactor may carry away heat that is generated during the polymerization reaction, which is considerably exothermic. During recirculation, the heat carried away from the reactor may be dissipated in a suitable manner (e.g., with a heat exchanger) prior to returning the recycle stream to the reactor. Concurrent with recirculation of the olefin monomers in the recycle stream, polymer particulates may be withdrawn from the reactor, and fresh (makeup) olefin monomer may be added to replace the quantity of olefin monomers consumed during polymerization.

Keeping the reactor within a predefined temperature range during polymerization may aid in maintaining catalyst and polymer stability and/or precluding the polymer particulates from undesirably coalescing together as they form. Formation of a coalesced mass of polymer particulates may foul the reactor and lead to significant process downtime. The coalescence of polymer particulates, regardless of how coalescence occurs, is referred to as "stickiness" herein. The temperature constraints needed to preclude polymer stickiness may become problematic due to decreased polymerization rates at lower reaction temperatures, thereby increasing production costs. Additional care may also be needed when utilizing a fluidized bed reactor system to avoid process changes, including temperature upsets, which may lead to product chunking or sheeting, fluidized bed collapse, reaction termination, and/or reactor fouling. Because of the substantial risk of upsetting a commercial polymerization process when making process changes and/or fouling expensive reactors, it can be very difficult to determine how a particular process change may impact a fluidized bed polymerization reaction.

When gas phase polymerization reactions were initially investigated, it was presumed that the recycle stream would need to remain fully in the gas phase in order to avoid liquid occlusion of the recycle line. The temperature at which a recycle stream undergoes condensation to form a liquid is referred to as the "dew point." Subsequently, it was discovered that partial condensation within the recycle stream (i.e., by cooling the recycle stream below the dew point) prior to its return to the reactor may be tolerated and also afford advantageous effects during polymerization. Specifically, the condensed portion of the recycle stream (i.e., a liquid phase admixed with a gas phase) may undergo vaporization upon re-entering the reactor, thereby promoting more effective evaporative cooling than is possible with a circulating gas phase alone. Operating under temperature and pressure conditions such that at least some liquid phase is returned to the reactor with the recycle stream, particularly with a liquid phase content of about 2 wt % or above, is referred to as operating under "condensed mode" polymerization conditions.

Condensed mode polymerization conditions occur when there is liquid-vapor equilibrium at or below the dew point. Vaporization of the liquid phase occurs within the reactor to promote evaporative cooling of the reaction mixture, as described above. One strategy that may be utilized to promote improved cooling within the reactor is to use an induced condensing agent (ICA), typically a non-polymerizable hydrocarbon gas, within the recycle stream to increase the dew point. With the increased dew point, formation of the liquid phase may be enhanced and greater cooling effects may be realized upon vaporization of the recycle stream within the reactor. Isopentane is frequently used as an ICA, oftentimes in combination with one or more heavier hydrocarbons, as described in US Patent Publication 2019/0010261.

Although ICAs may promote desirable effects during a polymerization reaction, there are certain difficulties associated with their use. For example, isopentane and heavier hydrocarbon ICAs may decrease the melting point of the polymer in the reactor, thereby increasing polymer stickiness, which may promote clumping and/or reactor fouling. The increased polymer stickiness may limit the amount of isopentane and heavier ICAs that may be present during a polymerization reaction, thereby limiting the extent to which the reaction temperature may be regulated with the recycle stream.

SUMMARY

The present disclosure provides fluidized bed polymerization methods using isobutane as an induced condensing agent. The methods comprise: introducing to a reactor one or more olefinically unsaturated monomers in a continuous feed stream, the reactor having a fluidized bed comprising a Ziegler-Natta catalyst established therein; reacting the one or more olefinically unsaturated monomers under polymerization reaction conditions within the fluidized bed to form a plurality of polyolefin particulates; removing unreacted olefinically unsaturated monomers from the reactor, and returning continuously to the reactor a recycle stream comprising an induced condensing agent and the unreacted olefinically unsaturated monomers. The recycle stream is returned to the reactor under conditions suitable to form a condensed mode or a super-condensed mode in the recycle stream prior to re-entering the reactor. The induced condensing agent contains no $C_{6+}$ hydrocarbons and comprises isobutane or a mixture of isobutane and isopentane. Low levels of other $C_4$ and $C_5$ hydrocarbons may optionally be present, including 10-20% butane in isobutene polymerization reactions.

Some or other polymerization methods using isobutane as an induced condensing agent may comprise: introducing to a reactor one or more olefinically unsaturated monomers in a continuous feed stream, the reactor having a fluidized bed comprising a Ziegler-Natta catalyst established therein; reacting the one or more olefinically unsaturated monomers under polymerization reaction conditions within the fluidized bed to form a plurality of polyolefin particulates; removing unreacted olefinically unsaturated monomers from the reactor, and returning continuously to the reactor a recycle stream comprising the unreacted olefinically unsaturated monomers and an induced condensing agent comprising isopentane and no isobutane; wherein the recycle stream is returned to the reactor under conditions suitable to form a condensed mode or a super-condensed mode in the recycle stream prior to re-entering the reactor; after a predetermined period of time, introducing isobutane into the recycle stream prior to the recycle stream re-entering the reactor; and collecting at least a portion of the plurality of polyolefin particulates from the reactor.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one of ordinary skill in the art and having the benefit of this disclosure.

DETAILED DESCRIPTION

Figure 1:
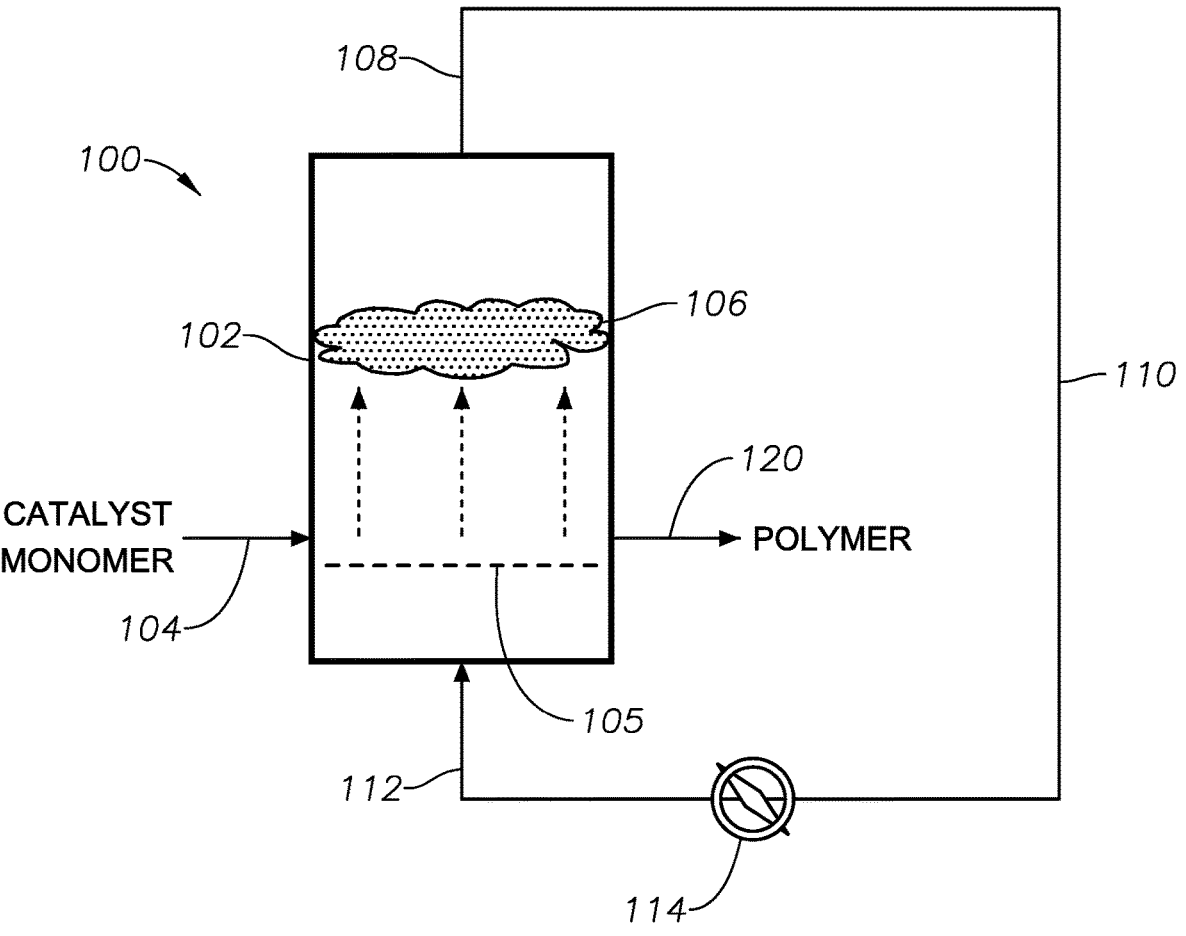
FIG. 1 shows a diagram of an illustrative fluidized bed reactor featuring a recycle stream, which may be used in the present disclosure.

The present disclosure generally relates to olefin polymerization and, more specifically, to fluidized bed methods for polymerizing olefins in the presence of light induced condensing agents (ICAs) under conditions suitable to support condensed or super-condensed mode operations.

As discussed above, olefins may be effectively polymerized under fluidized bed reaction conditions using both metallocene and Ziegler-Natta catalysts. Such polymerization reactions may be conducted under condensed mode operations, wherein a portion of a recycle stream provided to the reactor contains a liquid phase. The liquid phase in the recycle stream may promote more effective cooling of the reaction mixture in the reactor than is possible with a circulating gas alone. An inert condensing agent (ICA) may be incorporated within the recycle stream to promote more effective formation of the liquid phase. Isopentane and heavier hydrocarbons are commonly employed ICAs. However, isopentane and heavier hydrocarbons may lower the polymer melting point and promote polymer stickiness when used excessively in an ICA, which may lead to process difficulties.

The present disclosure demonstrates that including isobutane as at least a portion of the ICAs in a recycle stream may alleviate certain difficulties associated with isopentane and heavier hydrocarbons. Surprisingly, including isobutane alone or in combination with isopentane as the ICA(s) in a recycle stream may alleviate the melting point decrease and polymer stickiness that are promoted by isopentane and heavier hydrocarbons. Up to about 3.2 times more isobutane by weight (up to about 4.2 times more isobutane on a molar basis) may be present compared to isopentane before polymer stickiness occurs, thereby allowing greater thermal control of the polymerization reaction to be realized. By employing an ICA containing isobutane in the above amounts, a recycle stream may feature a super-condensed mode having up to about 30 wt % of a liquid state or even higher amounts. Higher amounts of the liquid state may be present depending upon the separation between the reactor temperature and the dew point; the more closely these values approach one another, the greater the amount of the liquid state. Excessive liquid formation, particularly with the reactor temperature equaling the dew point, may hamper the reaction. The term "super-condensed" refers to a condensed mode having about 19 wt % or greater of a liquid state. Super-condensed modes are much more difficult to achieve with isopentane alone and/or in combination with heavier ICAs. Introduction of even small molar amounts of isobutane into a recycle stream comprising predominantly isopentane may be sufficient to promote more effective condensed or super-condensed mode operations, in addition to the other desirable effects discussed herein. There is unexpected synergy when introducing small molar amounts of isobutane into a predominantly isopentane recycle stream, since the changes in process observables are generally more pronounced than would be expected based upon the amount of isobutane that is present. Without being bound by theory or mechanism, the introduction of isobutane may desirably impact the vapor pressure and increase competitive adsorption of ethylene onto catalyst particulates to allow a reaction to take place more readily.

The surprising effects of including isobutane as an ICA within a recycle stream may be particularly pronounced when using a Ziegler-Natta catalyst under fluidized bed polymerization conditions. Namely, increased catalyst productivity may be realized when conducting a fluidized bed polymerization reaction in the presence of isobutane and a Ziegler-Natta catalyst, which contrasts the behavior typically seen when using a metallocene catalyst. Without being bound by theory or mechanism, it is believed that the isobutane may promote increased olefinic monomer (olefinically unsaturated monomer) adsorption into the pores of the Ziegler-Natta catalyst, thereby promoting more effective growth of the polymer particulates therein. Higher reactor temperatures accessible with the present disclosure may lead to favorable process variations when using Ziegler-Natta catalyst that may not occur when using a metallocene catalyst. As such, isobutane may facilitate a polymerization reaction taking place under fluidized bed conditions by at least increasing catalyst productivity over a broadened temperature range and lessening polymer stickiness.

All numerical values within the detailed description and the claims herein are modified by "about" or "approximately" with respect to the indicated value, and take into account experimental error and variations that would be expected by a person having ordinary skill in the art. Unless otherwise indicated, room temperature is about 25° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A", and "B."

The term "transition metal" refers to any atom from Groups 3-12 of the Periodic Table, inclusive of the lanthanides and actinide elements.

For the purposes of the present disclosure, the new numbering scheme for groups of the Periodic Table is used. In said numbering scheme, the groups (columns) are numbered sequentially from left to right from 1 through 18, excluding the f-block elements (lanthanides and actinides).

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weights (e.g., Mw, Mn, Mz) are in units of g/mol.

The term "hydrocarbon" refers to a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different numbers of carbon atoms. The term "$C_n$" refers to hydrocarbon(s) or a hydrocarbyl group having n carbon atom(s) per molecule or group, wherein n is a positive integer. Such hydrocarbon compounds may be one or more of linear, branched, cyclic, acyclic, saturated, unsaturated, aliphatic, or aromatic.

The terms "hydrocarbyl" and "hydrocarbyl group" are used interchangeably herein. The term "hydrocarbyl group" refers to any $C_1$-$C_{100}$ hydrocarbon group bearing at least one unfilled valence position when removed from a parent compound. "Hydrocarbyl groups" may be optionally substituted, in which the term "optionally substituted" refers to replacement of at least one hydrogen atom or at least one carbon atom with a heteroatom or heteroatom functional group. Heteroatoms may include, but are not limited to, B, O, N, S, P, F, Cl, Br, I, Si, Pb, Ge, Sn, As, Sb, Se, and Te. Hydrocarbyl groups therefore may include alkyl, alkenyl, alkynyl, aryl, heteroaryl, cycloalkyl, heterocyclyl, and the like, any of which may be optionally substituted.

The term "alkyl" refers to a hydrocarbyl group having no unsaturated carbon-carbon bonds, and which may be optionally substituted.

The term "alkenyl" refers to a hydrocarbyl group having a carbon-carbon double bond, and which may be optionally substituted. The terms "alkene" and "olefin" are used synonymously herein. Similarly, the terms "alkenic" and "olefinic" are used synonymously herein. Unless otherwise noted, all possible geometric isomers are encompassed by these terms.

The terms "aromatic" and "aromatic hydrocarbon" refer to a hydrocarbon or hydrocarbyl group having a cyclic arrangement of conjugated pi-electrons that satisfy the Hückel rule. The term "aryl" is equivalent to the term "aromatic" as defined herein. The term "aryl" refers to both aromatic compounds and heteroaromatic compounds, either of which may be optionally substituted. Both mononuclear and polynuclear aromatic compounds are encompassed by these terms.

The terms "linear" and "linear hydrocarbon" refer to a hydrocarbon or hydrocarbyl group having a continuous carbon chain without side chain branching.

The term "linear alpha olefin (LAO)" refers to an alkenic hydrocarbon bearing a carbon-carbon double bond at a terminal (end) carbon atom of the main carbon chain.

The terms "branch," "branched" and "branched hydrocarbon" refer to a hydrocarbon or hydrocarbyl group having a linear main carbon chain in which a hydrocarbyl side chain extends from the linear main carbon chain.

The terms "unbranched" and "normal" refer to a straight-chain hydrocarbon or hydrocarbyl group.

The term "homopolymer" refers to a polymer in which all monomers (mer units) are the same. The term "copolymer" refers to a polymer in which two or more different monomers (mer units) are present. The term "terpolymer" refers to a polymer in which three different monomers (mer units) are present. The term "different" indicates that the monomers (mer units) differ from one another by the presence or absence of at least one atom and/or isomerically.

The term "polyolefin" refers to a polymer comprised of one or more olefinic monomers. Unless indicated otherwise, the term "polyolefin" refers to any of homopolymers, copolymers containing two different monomers, and/or higher copolymers, such as terpolymers. Polyolefins may be formed from polymerization of one or more olefinically unsaturated monomers under fluidized bed conditions, as discussed herein.

Methods of the present disclosure may comprise: introducing to a reactor one or more olefinically unsaturated monomers in a continuous feed stream, the reactor having a fluidized bed comprising a Ziegler-Natta catalyst established therein; reacting the one or more olefinically unsaturated monomers under polymerization reaction conditions within the fluidized bed to form a plurality of polyolefin particulates; removing unreacted olefinically unsaturated monomers from the reactor, and returning continuously to the reactor a recycle stream comprising an induced condensing agent and the unreacted olefinically unsaturated monomers. The recycle stream is returned to the reactor under conditions suitable to form a condensed mode or a super-condensed mode in the recycle stream prior to re-entering the reactor. The induced condensing agent contains no $C_{6+}$ hydrocarbons and comprises isobutane or a mixture of isobutane and isopentane. Optionally, other $C_{5-}$ hydrocarbons may be present, such as butane, propane, ethane, or methane.

Before providing further description of suitable process conditions and suitable variants of Ziegler-Natta or Ziegler-Natta type catalysts, illustrative fluidized bed polymerization processes will be described in additional detail with reference to FIG. 1 so that the embodiments of the present disclosure may be better understood.

As shown in FIG. 1, reactor system 100 includes reactor vessel 102. Feed 104 is configured to supply a Ziegler-Natta catalyst and olefinically unsaturated monomers to the interior of reactor vessel 102. Although shown as a single feed, feed 104 may supply the Ziegler-Natta catalyst and olefinically unsaturated monomers separately. Isobutane or other induced condensing agents may also be supplied through feed 104 or at another location. An upward flow of gas is provided within reactor vessel 102 after passing through distributor plate 105 to form fluidized bed 106 comprising particulates of the Ziegler-Natta catalyst. Unreacted olefinically unsaturated monomers and induced condensing agent leave reactor vessel 102 via line 108 and proceed through recycle line 110 as a recycle stream before recirculating to reactor vessel 102 via line 112. Within recycle line 110, heat exchanger 114 cools the recycle stream to promote formation of a condensed or super-condensed mode comprising a liquid phase. Upon re-entering reactor vessel 102, the recycle stream promotes fluidization of fluidized bed 106, and vaporization of the liquid phase promotes evaporative cooling of the polymerization reaction. Polyolefin product is continuously removed from reactor vessel 102 via line 120 as polymerization occurs. Although not shown, further processing of the polyolefin product may take place after being removed from reactor vessel 102.

Ziegler-Natta catalysts suitable for use in the disclosure herein may include both traditional Ziegler-Natta catalysts (titanium compound activated with an aluminum alkyl or other organometallic reagent) and Ziegler-Natta type catalysts that are transition metal compounds similarly activated with a suitable organometallic reagent. Particularly suitable Ziegler-Natta type catalysts may include zirconium-, titanium-, magnesium- or chromium based-catalysts. Such catalysts may be pre-formed when provided to the reactor, or they may be formulated on-the-fly (inline) by combining the catalyst components in the supply line feeding the catalyst to the reactor.

Ziegler-Natta or Ziegler-Natta type catalysts suitable for use in the present disclosure may comprise a reaction product of a transition metal compound from Groups 3 to 17, more typically Groups 4 to 6, of the Periodic Table of Elements, and an organometallic activator, which serves as a co-catalyst. Prior to forming the reaction product in the presence of the co-catalyst, the transition metal compounds may be represented by the formula $MR_x$, wherein M is a metal from Groups 3 to 17, more typically Groups 4 to 6, of the Periodic Table of Elements, R is a halogen or an oxyhydrocarbyl group, and x is the oxidation state of the metal M. Ti may be a particularly suitable transition metal. Non-limiting examples of R include, for instance, alkoxy, phenoxy, bromide, chloride and fluoride. Non-limiting examples of suitable transition metal compounds having M as titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, and the like.

Non-limiting examples of organometallic compounds suitable for serving as a co-catalyst in the present disclosure may include compounds such as, for instance, methyllithium, butyllithium, diphenylmercury, butylmagnesium, diethylcadmium, benzylpotassium, diethylzinc, triethylaluminum, tri-n-butylaluminum, diisobutyl ethylboron, diethylcadmium, di-n-butylzinc and tri-n-amylboron. Aluminum alkyls, such as tri-hexylaluminum, triethylaluminum, trimethylaluminum, and triisobutylaluminum, may be particularly suitable co-catalysts. Other suitable co-catalysts include mono-organohalides and hydrides of Group 2 metals, and mono- or di-organohalides and hydrides of Group 3 and 13 metals. Non-limiting examples of other co-catalysts that also may be suitable for use in the disclosure herein include compounds such as, for instance, di-isobutylaluminum bromide, isobutylboron dichloride, methyl magnesium chloride, ethylberyllium chloride, ethyl-calcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride.

Some Ziegler-Natta type catalysts may be two-component zirconium-based catalysts. The first component may be an adduct of a zirconium halide (i.e., $ZrCl_aBr_b$, wherein each of a and b is 0, 1, 2, 3 or 4 and a+b=4) with an organic compound having up to about 30 carbon atoms and that is selected from the group consisting of esters, ketones, ethers, amines, nitriles, anhydrides, acid chlorides, amides and aldehydes, and second component may be an alkylaluminum or alkylzinc compound selected from the group consisting of $R_2AlX$, $RAlX_2/R_3Al_2X_3$, $R_3Al$, and $R_2Zn$, in which R is a $C_1$-$C_{20}$ alkyl group and X is $C_1$ or Br. The zirconium halide adduct (first component) may include a mole ratio of the organic compound to zirconium ranging between about 0.9:1 to about 2:1. Such catalysts may likewise be preformed when provided to the reactor, or they may be formulated on-the-fly (inline) by combining the catalyst components in the supply line feeding the catalyst to the reactor.

Particular zirconium-based Ziegler-Natta type catalysts may feature an ester having a formula of $R^1COOR^2$, wherein $R^1$ and $R^2$ are each a $C_1$-$C_{30}$ alkyl, aryl, alkaryl, or aralkyl groups, with the proviso that $R^1$ may also be hydrogen. $R^1$ and $R^2$ taken together may also represent a cycloaliphatic group and the ester may be a lactone such as γ-butyrolactone or a phthalide. Alkyl esters having about 6 to about 16 carbon atoms may be desirable, such as n-hexyl acetate, n-heptyl acetate, n-octyl acetate, n-nonyl acetate, n-decyl acetate, isohexyl acetate, isodecyl acetate and the like, which may form dimeric equimolar adducts with $ZrCl_4$.

When forming a Ziegler-Natta catalyst or a Ziegler-Natta type catalyst, a mole ratio of the organometallic activator to the transition metal compound may range from about 1:1 and about 50:1 or from about 10:1 to about 25:1.

Suitable Ziegler-Natta and Ziegler-Natta type catalysts may be disposed upon a suitable solid support. Solid supports are not considered to be particularly limited, provided that they are compatible with the polymerization reaction conditions. Magnesium chloride and silica represent illustrative solid supports that may be utilized in the present disclosure. Other solids supports that may be used in combination with Ziegler-Natta catalysts in the present disclosure include, for example, talc, clay, titania, alumina, magnesia, zirconia, boria, iron oxides, zinc oxides, barium oxides, graphite, and the like.

A particular example of a Ziegler-Natta catalyst system for use in the present disclosure comprises $TiCl_3$ as the transition metal source, an aluminum alkyl as the activator and $MgCl_2$ and silica as the solid supports. The catalyst system may be dispersed in tetrahydrofuran (THF) for dispensation into a fluidized bed reactor.

Various process control variables and polymerization reaction conditions may be established to maintain a desired productivity for the polymerization reaction and properties of the resulting polyolefin. Process control variables that may be measured and regulated include, for example, the amount(s) and molar ratios of the ICA(s), the amount(s) and molar ratios of olefinically unsaturated monomer(s), the partial pressures and flow rates of the monomer(s), the catalyst inventory within the reactor, gas flow rates, recycle rates, and the polymerization reaction temperature.

A solid Ziegler-Natta catalyst, a catalyst slurry comprising the Zeigler-Natta catalyst, or liquid solution of the Ziegler-Natta catalyst may be injected directly into the reactor using a suitable carrier gas (e.g., nitrogen) or one or more ICAs (e.g., isobutane and/or isopentane), where the feed rate of the Ziegler-Natta catalyst may be adjusted to change or maintain the catalyst inventory in the reactor. The catalyst inventory may be varied to support a desired rate of polymer production.

A gas velocity of about 1 ft/sec to about 5 ft/sec or about 1 ft/sec to about 3 ft/sec may be used to maintain a fluidized bed within the reactor at a total pressure of about 300 psi. The gas velocity may be based upon the total amount of gas circulating through the reactor. Gases contributing to the gas velocity may include, for example, carrier gas, ICAs, monomers, hydrogen, and any combination thereof. Gas velocities may be measured by any suitable flow rate monitor, either within or external to the reactor. The gas composition within the reactor may be measured with a gas chromatograph.

The partial pressure of the ICA(s) within the reactor may be up to about 200 psi (1,379 kPa), or about 5 psi (34 kPa) to about 150 psi (1,034 kPa), or about 20 psi (138 kPa) about 100 psi (689 kPa).

The mole percent of an individual ICA within the reactor relative to the total amount of gas may be up to about 50 mol %, or about 1 mol % to about 40 mol %, or about 5 mol % to about 30 mol %, or about 10 mol % to about 20 mol %. Isobutane may be present within any of these mole percent ranges.

The olefin partial pressure, which is proportional to the amount of monomer(s) that are present, may range up to about 600 psi (4,138 kPa), or about 100 psi (690 kPa) to about 600 psi (4,138 kPa), or about 100 psi (690 kPa) to about 400 psi (2,759 kPa), or about 150 psi (1,034 kPa) to about 250 psi (1,724 kPa). Total pressures in the reactor may range from about 500 psi (3,450 kPa) to about 5,000 psi (34,500 kPa), or about 1,000 psi (6,900 kPa) to about 3,500 psi (24,100 kPa).

When co-monomers are present with other olefinically unsaturated monomers, the mole ratio between the two co-monomers may be established at any suitable ratio. The co-monomer may be present at any molar ratio that may promote incorporation of the co-monomer into the resulting polyolefin in a desired amount. Olefinically unsaturated monomers may be present in a mole ratio range in the gas phase of about 0.0001 to about 50, or from about 0.0001 to about 5, or from about 0.0005 to about 1.0, or from about 0.001 to about 0.5.

The polymerization reaction temperature may range from about 30° C. to about 250° C., or 40° C. to about 120° C., or about 60° C. to about 115° C., about 70° C. to about 110° C., or about 70° C. to about 105° C.

As described herein, isobutane may be included as an induced condensing agent in the recycle stream of a fluidized bed polymerization reaction under conditions such that the recycle stream features a condensed or super-condensed mode when re-entering the reactor. In particular examples, the induced condensing agent may consist of or essentially consist of isobutane, or consist of or consist essentially of a mixture of isobutane and isopentane. Small amounts of $C_{5-}$ hydrocarbons such as butane, propane, ethane, or methane may be present as well. The molar amount of isobutane in the recycle stream may be sufficient to afford a condensed mode containing at least about 2 wt % liquid phase, and in particular examples, the recycle stream may feature a super-condensed mode containing at least about 18 wt % liquid phase. Super-condensed modes containing up to 30 wt % liquid phase, or up to 40 wt % liquid phase, or up to 50 wt % liquid phase, or up to 60 wt % liquid phase, or up to 70% liquid phase may be realized by applying the disclosure herein.

The recycle stream may comprise up to about 40 mol % induced condensing agent in the methods described herein. As such, up to about 40 mol % isobutane may be present in the recycle stream, optionally in combination with isopentane and/or other hydrocarbons. The isobutane may be present in a molar excess compared to the isopentane in particular examples. In more specific examples, the recycle stream may comprise up to about 20 mol % isobutane in combination with up to 20 mol % isopentane. In a still more specific example, the recycle stream may comprise about 10-20 mol % isobutane and about 10-20 mol % isopentane, provided that the isobutane is present in molar excess compared to the isopentane. In some or other more specific examples, the recycle stream may comprise at least about 0.5 mol % isobutane, or at least about 1 mol % isobutane, or at least about 2 mol % isobutane, or at least about 3 mol % isobutane.

The isobutane and isopentane may be present in the recycle stream from the outset of conducting a polymerization reaction according to the disclosure herein, or the isobutane may be metered into the recycle stream as the polymerization reaction takes place. When metered into the recycle stream, the isobutane may be present in a lower molar amount than is the isopentane.

In the present disclosure, the recycle stream may comprise an amount of isobutane that is sufficient to increase productivity of the Ziegler-Natta catalyst relative to $C_{5+}$ induced condensing agents alone, such as isopentane or isopentane in combination with $C_{6+}$ hydrocarbons. In a particular example, the amount of isobutane in the recycle stream may be sufficient to increase productivity of the Ziegler-Natta catalyst by a factor of at least about 1.7 relative to that obtained when the induced condensing agent consists of isopentane alone. In order to accomplish the foregoing, at least about 0.5 mol % isobutane may be present in the recycle stream, or at least about 1 mol %, or at least about 2 mol %, or at least about 3 mol %, or at least about 4 mol %, or at least about 5 mol % isobutane, or at least about 10 mol % isobutane, or at least about 15 mol % isobutane, or at least about 20 mol % isobutane, or at least about 25 mol % isobutane, or at least about 30 mol % isobutane may be present. In particular examples, about 10 mol % to about 25 mol % isobutane may be present in the recycle stream.

The recycle stream may comprise about 30 mol % to about 60 mol % unreacted olefinically unsaturated monomers in the methods described herein. In more particular examples, the recycle stream may comprise about 30 mol % to about 50 mol % unreacted olefinically unsaturated monomers, or about 33 mol % to about 50 mol % unreacted olefinically unsaturated monomers. The foregoing ranges may be particularly applicable when ethylene is the olefinically unsaturated monomer.

The polymerization reaction may be conducted with isobutane present in the recycle stream from the outset of the polymerization reaction, or the polymerization reaction may be conducted with another induced condensing agent present in the recycle stream initially, with the isobutane being combined with or replacing the other induced condensing agent at a later time in the polymerization reaction. That is, the isobutane may be metered into the recycle stream in certain process configurations. In particular, methods of the present disclosure may comprise forming the plurality of polyolefin particulates initially for a predetermined time period while returning an initial recycle stream lacking isobutane to the reactor, and introducing isobutane into the recycle stream or reactor until a predetermined isobutane concentration is reached. The predetermined isobutane concentration may be sufficient to support an increased rate of catalyst productivity, for example, as discussed herein.

Methods of the present disclosure may further comprise introducing hydrogen gas to the reactor. The hydrogen gas may be introduced separately from the continuous feed stream, or the hydrogen gas may be present within the continuous feed stream. When used, the hydrogen gas may be present in an amount up to 35 mol % within the reactor. In more particular examples, the amount of hydrogen gas within the reactor may range from about 3 mol % to about 35 mol %. When used, the recycle stream may comprise at least a portion of the hydrogen gas as well.

In the present disclosure, the one or more olefinically unsaturated monomers may comprise one or more alkenic hydrocarbons. In particular, the one or more olefinically unsaturated monomers may comprise at least ethylene. In more particular examples, the one or more olefinically unsaturated monomers may comprise a mixture of ethylene and at least one alpha olefin. Suitable alpha olefins that may undergo copolymerization with ethylene according to the disclosure herein include, for example, $C_3$ to $C_{30}$ alpha olefins, such as propylene, 1-butene, 1-pentene, 1-hexene, 1-heptene, 1-octene, 1-nonene, 1-decene, 1-undecene, 1-dodecene, 1-hexadecene, 1-eicosene, or mixtures thereof. A suitable ratio of ethylene to alpha olefin is not considered to be particularly limited and may be dictated by properties sought to be obtained in the polyolefin obtained from the polymerization reaction.

Other olefinically unsaturated monomers that may be polymerized according to the disclosure herein, either alone or in combination with ethylene, alpha olefins, or other olefinically unsaturated monomers include, for example, butadiene, 1,3-pentadiene, 1,4-pentadiene, 1,3-hexadiene, 1,4-hexadiene, cyclopentadiene, dicyclopentadiene, 4-vinyl-cyclohex-1-ene, methyloctadiene, 1-methyl-1,6-octadiene, 7-methyl-1,6-octadiene, 1,5-cyclooctadiene, norbornadiene, ethylidene norbornene, 5-vinylidene-2-norbornene, 5-vinyl-2-norbornene, and the like.

Copolymers produced according to the disclosure herein may comprise from 99.0 to about 80.0 wt %, or 99.0 to 85.0 wt %, or 99.0 to 87.5 wt %, or 99.0 to 90.0 wt %, or 99.0 to 92.5 wt %, or 99.0 to 95.0 wt %, or 99.0 to 97.0 wt % ethylene monomer units and about 1.0 to about 20.0 wt %, or 1.0 to 15.0 wt %, or 0.5 to 12.5 wt %, or 1.0 to 10.0 wt %, or 1.0 to 7.5 wt %, or 1.0 to 5.0 wt %, or 1.0 to 3.0 wt % monomer units derived from an alpha olefin or other olefinically unsaturated monomer. The one or more olefinically unsaturated monomers within the continuous feed stream may mirror the foregoing weight percentages such that a corresponding percentage of olefins are introduced to the resulting polyolefin.

Accordingly, certain more specific methods of the present disclosure may comprise: introducing to a reactor one or more olefinically unsaturated monomers in a continuous feed stream, the reactor having a fluidized bed comprising a Ziegler-Natta catalyst established therein; reacting the one or more olefinically unsaturated monomers under polymerization reaction conditions within the fluidized bed to form a plurality of polyolefin particulates; removing unreacted olefinically unsaturated monomers from the reactor, and returning continuously to the reactor a recycle stream comprising the unreacted olefinically unsaturated monomers and an induced condensing agent comprising isopentane and no isobutane; wherein the recycle stream is returned to the reactor under conditions suitable to form a condensed mode or a super-condensed mode in the recycle stream; after a predetermined period of time, introducing isobutane into the recycle stream prior to re-entering the reactor; and collecting at least a portion of the plurality of polyolefin particulates from the reactor. The polyolefin particulates may be collected continuously or discontinuously from the reactor, preferably continuously.

Polyolefins produced according to the disclosure herein are not considered to be particularly limited in terms of composition or properties. Depending on the properties sought, the polymerization reaction conditions, including introduction of a recycle stream comprising isobutane as an induced condensing agent, may be regulated to vary one or more of the polyolefin melt index, molecular weight, or a similar property.

Embodiments disclosed herein include: A. Fluidized bed polymerization methods utilizing ICAs. The methods comprise: introducing to a reactor one or more olefinically unsaturated monomers in a continuous feed stream, the reactor having a fluidized bed comprising a Ziegler-Natta catalyst established therein; reacting the one or more olefinically unsaturated monomers under polymerization reaction conditions within the fluidized bed to form a plurality of polyolefin particulates; removing unreacted olefinically unsaturated monomers from the reactor, and returning continuously to the reactor a recycle stream comprising an induced condensing agent and the unreacted olefinically unsaturated monomers; wherein the recycle stream is returned to the reactor under conditions suitable to form a condensed mode or a super-condensed mode in the recycle stream prior to re-entering the reactor, and wherein the induced condensing agent contains no $C_{6+}$ hydrocarbons and comprises isobutane or a mixture of isobutane and isopentane.

B. Fluidized bed polymerization methods featuring an ICA concentration gradient. The methods comprise: introducing to a reactor one or more olefinically unsaturated monomers in a continuous feed stream, the reactor having a fluidized bed comprising a Ziegler-Natta catalyst established therein; reacting the one or more olefinically unsaturated monomers under polymerization reaction conditions within the fluidized bed to form a plurality of polyolefin particulates; removing unreacted olefinically unsaturated monomers from the reactor, and returning continuously to the reactor a recycle stream comprising the unreacted olefinically unsaturated monomers and an induced condensing agent comprising isopentane and no isobutane; wherein the recycle stream is returned to the reactor under conditions suitable to form a condensed mode or a super-condensed mode in the recycle stream prior to re-entering the reactor;

after a predetermined period of time, introducing isobutane into the recycle stream prior to the recycle stream re-entering the reactor; and collecting at least a portion of the plurality of polyolefin particulates from the reactor.

Embodiments A and B may have one or more of the following additional elements in any combination:

Element 1: wherein the induced condensing agent consists essentially of isobutane.

Element 2: wherein the induced condensing agent consists essentially of a mixture of isobutane and isopentane.

Element 3: wherein the recycle stream re-enters the reactor in a condensed mode containing at least about 2 wt % liquid phase.

Element 4: wherein the recycle stream re-enters the reactor in a super-condensed mode containing at least about 18 wt % liquid phase.

Element 5: wherein the recycle stream comprises about 0.5 mol % to about 40 mol % induced condensing agent.

Element 6: wherein the recycle stream comprises at least about 0.5 mol % isobutane.

Element 7: wherein the recycle stream comprises at least about 40 wt % of the liquid phase when re-entering the reactor.

Element 8: wherein the one or more olefinically unsaturated monomers comprise ethylene.

Element 9: wherein the one or more olefinically unsaturated monomers comprise a mixture of ethylene and at least one alpha olefin.

Element 10: wherein the method further comprises: introducing hydrogen gas to the reactor.

Element 11: wherein an amount of isobutane in the recycle stream is sufficient to increase productivity of the Ziegler-Natta catalyst relative to that obtained when the induced condensing agent comprises only $C_{5+}$ hydrocarbons.

Element 12: wherein the amount of isobutane in the recycle stream is sufficient to increase productivity of the Ziegler-Natta catalyst by a factor of at least about 1.7 relative to that obtained when the induced condensing agent consists of isopentane alone.

Element 13: wherein the method further comprises: forming the plurality of polyolefin particulates initially for a predetermined time period while returning an initial recycle stream lacking isobutane to the reactor; and introducing isobutane into the recycle stream until a predetermined isobutane concentration is reached.

Element 14: wherein the method further comprises: collecting at least a portion of the plurality of polyolefin particulates from the reactor.

Element 15: wherein the polyolefin particulates are collected continuously from the reactor.

By way of non-limiting example, exemplary combinations applicable to A and B include: 1 or 2 and 3; 1 or 2 and 4; 1 or 2 and 5; 1 or 2 and 6; 1 or 2 and 7; 1 or 2 and 8 or 9; 1 or 2 and 10; 1 or 2 and 11; 1 or 2 and 12; 1 or 2 and 13; 1 or 2 and 14; 1 or 2 and 15; 3 or 4 and 5; 3 or 4 and 6; 3 or 4 and 7; 3 or 4 and 8 or 9; 3 or 4 and 10; 3 or 4 and 11; 3 or 4 and 12; 3 or 4 and 13; 3 or 4 and 14; 3 or 4 and 15; 6 and 7; 6 and 8 or 9; 6 and 10; 6 and 11; 6 and 12; 6 and 13; 6 and 14; 6 and 15; 7 and 8 or 9; 7 and 10; 7 and 11; 7 and 12; 7 and 13; 7 and 14; 7 and 15; 8 or 9 and 10; 8 or 9 and 11; 8 or 9 and 12; 8 or 9 and 13; 8 or 9 and 14; 8 or 9 and 15; 10 and 11; 10 and 12; 10 and 13; 10 and 14; 10 and 15; 11 and 12; 11 and 13; 11 and 14; 11 and 15; 12 and 13; 12 and 14; 12 and 15; 13 and 14; 13 and 15; and 14 and 15.

To facilitate a better understanding of the disclosure herein, the following examples of various representative embodiments are given. In no way should the following examples be read to limit, or to define, the scope of the present disclosure.

EXAMPLES

Example 1: A commercial UNIPOL reactor system (W.R. Grace, Inc.) containing a fluidized catalyst bed was initially producing ethylene/butylene polymer having a melt index of 1 and a nominal density of 0.918. A recycle stream containing only isopentane as an ICA was provided to the reactor during the initial reaction period. The recycle stream was provided to the reactor under conditions suitable to promote formation of a liquid phase in the recycle stream. After a period of time, the isopentane feed was discontinued and an isobutane feed was introduced to the recycle stream to gradually increase the isobutane content therein. The isobutane content was maintained at a level allowed by stickiness models.

Figure 2:
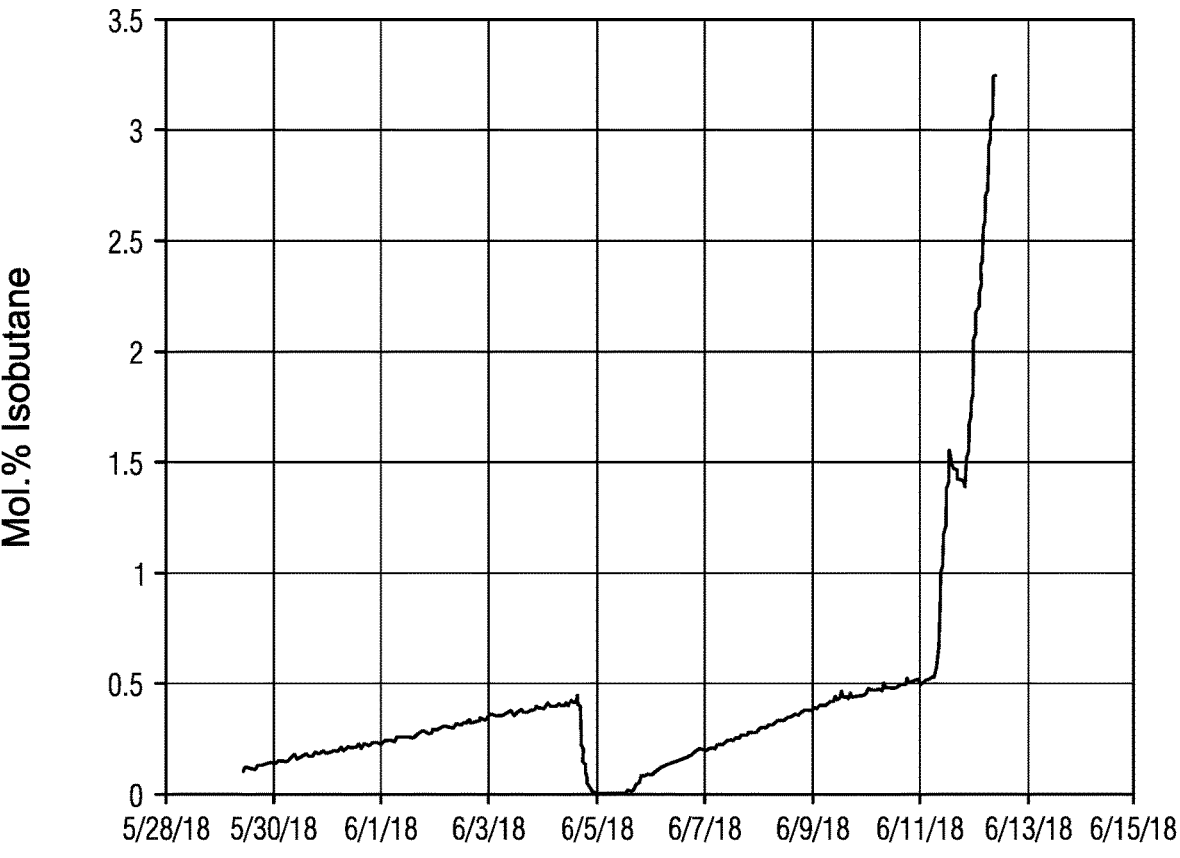
FIGS. 2-5 show graphs tracking various process parameters as a function of time during the illustrative fluidized bed polymerization reaction of the Example.
Figure 3:
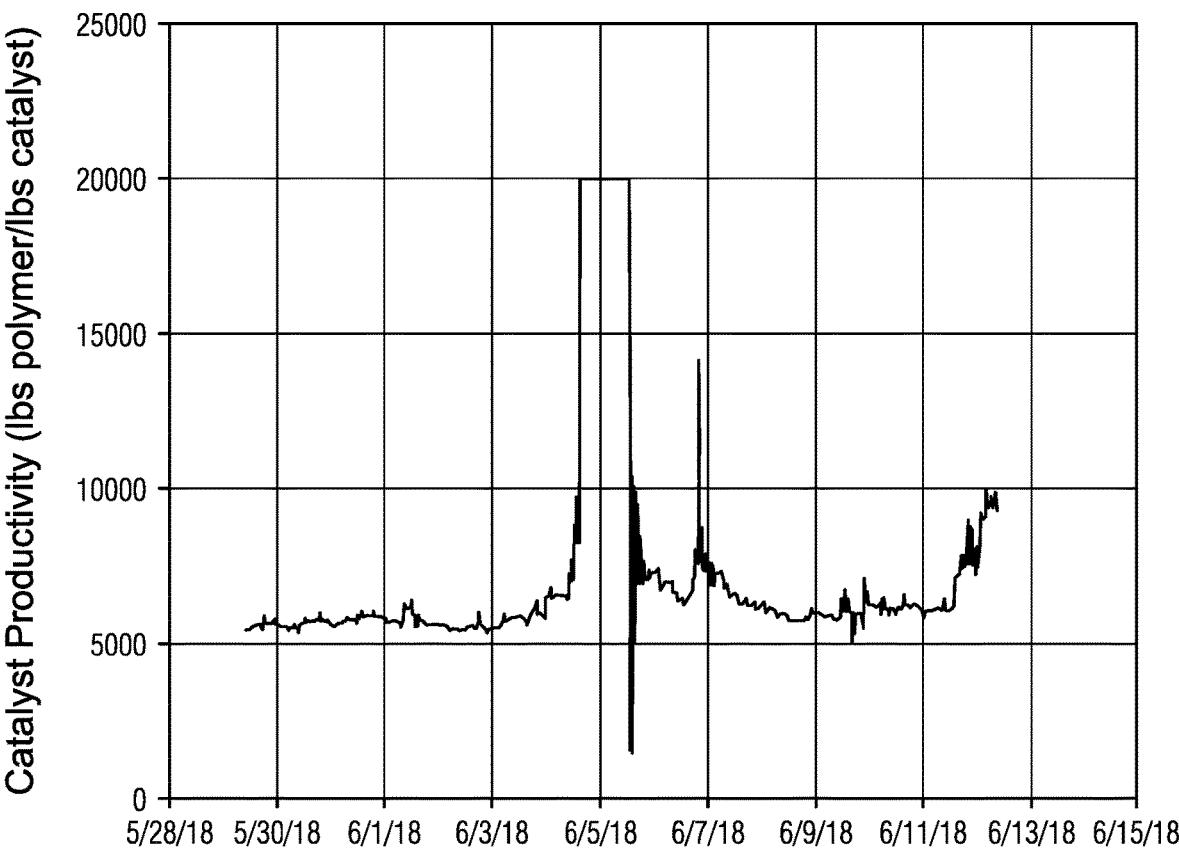
Figure 4:
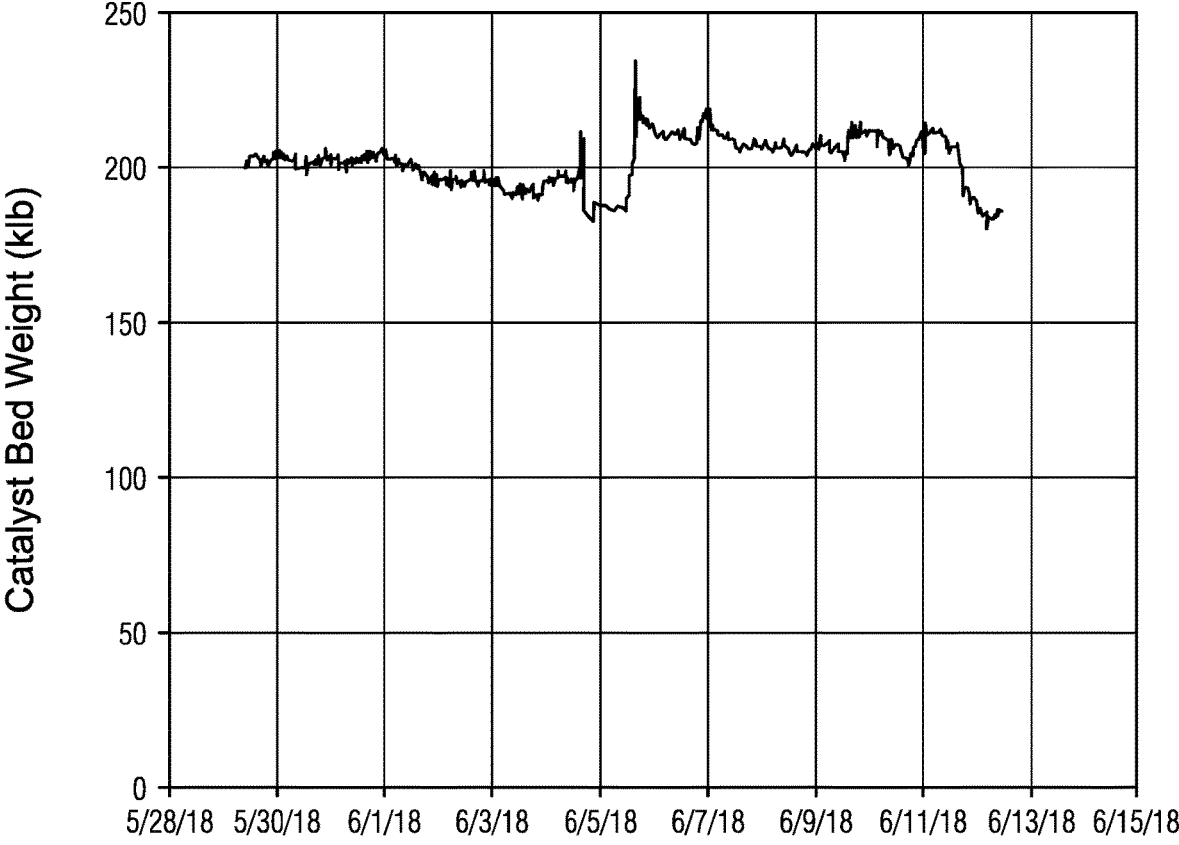
Figure 5:
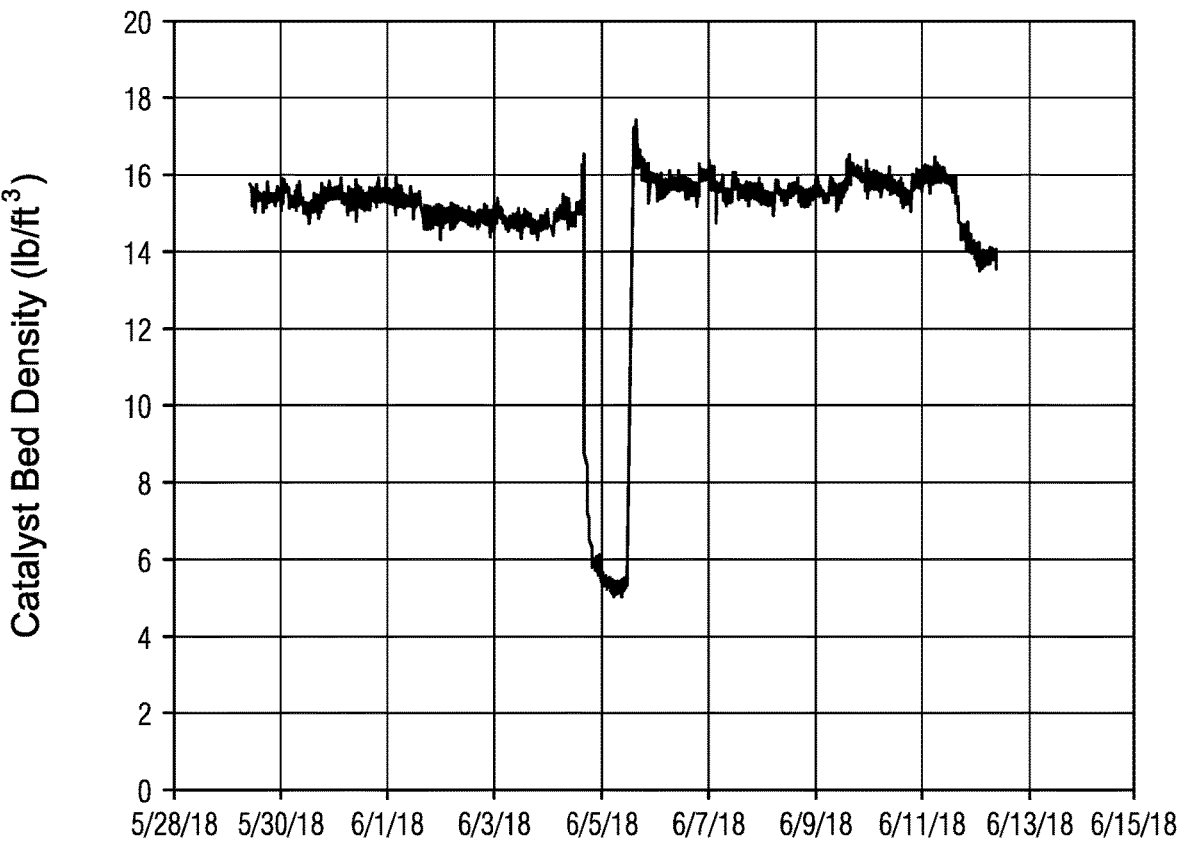

The catalyst productivity and the weight and density of the fluidized catalyst bed began changing quickly after the isobutane was added. FIGS. 2-5 show plots of various process parameters for the polymerization reaction. The discontinuity occurring around a date of 6/5 was due to a system outage (process upset). FIG. 2 shows a plot of the amount of isobutane in the recycle stream as a function of time. FIGS. 3-5 show plots of catalyst productivity, fluidized bed weight, and fluidized bed density, respectively. As shown in FIG. 3, the catalyst productivity increased very rapidly after the concentration of isobutane in the recycle stream exceeded 0.5 mol %. The catalyst productivity continued to rise as the amount of isobutane was increased. As shown in FIGS. 4 and 5, the catalyst bed weight and the catalyst bed density likewise changed soon after isobutane was introduced to the recycle stream and continued to increase with increasing amounts of isobutane.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A method comprising:
   introducing to a reactor one or more olefinically unsaturated monomers in a continuous feed stream, the reactor having a fluidized bed comprising a Ziegler-Natta catalyst established therein;
   reacting the one or more olefinically unsaturated monomers under polymerization reaction conditions within the fluidized bed to form a plurality of polyolefin particulates;
   removing unreacted olefinically unsaturated monomers from the reactor, and returning continuously to the reactor a recycle stream comprising an induced condensing agent and the unreacted olefinically unsaturated monomers;
      wherein the recycle stream is returned to the reactor under conditions suitable to form a condensed mode or a super-condensed mode in the recycle stream prior to re-entering the reactor;
      wherein the induced condensing agent consists of a mixture of isobutane and isopentane, in which the isobutane is present in a molar excess relative to the isopentane and the isobutane is present in the recycle stream in an amount of 3 mol % or greater; and
      operating in the super-condensed mode with the recycle stream comprising at least 18 wt % liquid phase that re-enters the reactor.

2. The method of claim 1, comprising operating in the super-condensed mode with the recycle stream comprising at least 30 wt % liquid phase that re-enters the reactor.

3. The method of claim 1, comprising operating in the super-condensed mode with the recycle stream comprising at least 40 wt % liquid phase that re-enters the reactor.

4. The method of claim 1, wherein the recycle stream comprises up to about 40 mol % induced condensing agent.

5. The method of claim 1, wherein the one or more olefinically unsaturated monomers comprise ethylene.

6. The method of claim 1, wherein the one or more olefinically unsaturated monomers comprise a mixture of ethylene and at least one alpha olefin.

7. The method of claim 1, further comprising:
   introducing hydrogen gas to the reactor.

8. The method of claim 7, wherein a concentration of hydrogen gas in the reactor is in a range of about 3 mol % to about 35 mol %.

9. The method of claim 1, wherein an amount of isobutane in the recycle stream is sufficient to increase productivity of the Ziegler-Natta catalyst relative to that obtained when the induced condensing agent comprises only $C_{5+}$ hydrocarbons.

10. The method of claim 9, wherein the amount of isobutane in the recycle stream is sufficient to increase productivity of the Ziegler-Natta catalyst by a factor of at least about 1.7 relative to that obtained when the induced condensing agent consists of isopentane alone.

11. The method of claim 1, further comprising:
   forming the plurality of polyolefin particulates initially for a predetermined time period while returning an initial recycle stream lacking isobutane to the reactor; and
   introducing isobutane into the recycle stream until a predetermined isobutane concentration is reached.

12. The method of claim 1, further comprising:
   collecting at least a portion of the plurality of polyolefin particulates from the reactor.

13. The method of claim 12, wherein the polyolefin particulates are collected continuously from the reactor.

14. A method comprising:
   introducing to a reactor one or more olefinically unsaturated monomers in a continuous feed stream, the reactor having a fluidized bed comprising a Ziegler-Natta catalyst established therein;
   reacting the one or more olefinically unsaturated monomers under polymerization reaction conditions within the fluidized bed to form a plurality of polyolefin particulates;
   removing unreacted olefinically unsaturated monomers from the reactor, and returning continuously to the reactor a recycle stream comprising the unreacted olefinically unsaturated monomers and an induced condensing agent consisting of isopentane;
   wherein the recycle stream is returned to the reactor under conditions suitable to form a condensed mode or a super-condensed mode in the recycle stream prior to re-entering the reactor;

after a predetermined period of time, introducing isobutane into the recycle stream prior to the recycle stream re-entering the reactor, in which the isobutane is present in a molar excess relative to the isopentane and the induced condensing agent consists of isobutane and isopentane; and collecting at least a portion of the plurality of polyolefin particulates from the reactor.

15. The method of claim 14, further comprising operating in the super-condensed mode with the recycle stream comprising at least 18 wt % liquid phase that re-enters the reactor, wherein up to about 40 mol % induced condensing agent is present in the recycle stream.

16. The method of claim 14, further comprising introducing hydrogen gas to the reactor, wherein at least about 0.5 mol % isobutane is present in the recycle stream after addition of the isobutane thereto.

17. The method of claim 14, wherein the one or more olefinically unsaturated monomers comprise a mixture of ethylene and at least one alpha olefin.

* * * * *